United States Patent Office 3,456,017
Patented July 15, 1969

3,456,017
GLYCOL PRODUCTION
Curtis W. Smith, Old Greenwich, Conn., and Ronald F. Mason, Mill Valley, Calif., assignors to Shell Oil Company, New York, N.Y., a corporation of Delaware
No Drawing. Filed Oct. 21, 1965, Ser. No. 500,276
Int. Cl. C07c 47/18, 27/20, 31/20
U.S. Cl. 260—602                                    10 Claims

ABSTRACT OF THE DISCLOSURE

Trimethylene glycol is produced by contacting ethylene oxide, carbon monoxide and hydrogen in the presence of certain phosphine-modified cobalt carbonyl catalysts.

---

This invention relates to an improved process for the production of trimethylene glycol and β-hydroxypropionaldehyde by hydroformylation of ethylene oxide.

It is known that epoxide compounds, i.e., oxirane compounds, are reactive under hydroformylation conditions. Niederhauser, U.S. 3,130,233 issued Apr. 21, 1964, discloses a process for reacting a variety of epoxide compounds with carbon monoxide and hydrogen in the presence of certain Group VIII metal catalysts. Although this process, in some instances, results in the production of a β-hydroxyaldehyde product, when an epoxide reactant of a relatively simple structure was employed the sole produce was an α,β-unsaturated aldehyde. For example, hydroformylation of ethylene oxide and propylene oxide afforded acrolein and crotonaldehyde respectively. A similar process is disclosed by Yokokawa et al., Bull. Chem. Soc. Japan, 37, 677 (1964), wherein reaction of ethylene oxide gave acrolein as the product.

It is an object of the present invention to provide an improved process for the hydroformylation of ethylene oxide. More particularly, it is an object to provide a hydroformylation process wherein trimethylene glycol and β-hydroxypropionaldehyde are observed as product when ethylene oxide is reacted with carbon monoxide and hydrogen under Oxo conditions. A specific object is to provide a process for the production of trimethylene glycol from ethylene oxide.

It has now been found that these objects are accomplished by the process of contacting ethylene oxide with carbon monoxide and molecular hydrogen in liquid phase solution in inert reaction solvent in the presence of certain phosphine-modified cobalt carbonyl catalysts.

The catalysts employed in the process of the invention are phosphine-modified cobalt carbonyl complexes, particularly dicobalt hexacarbonyl complexes wherein the remaining two coordination numbers of the cobalt moieties are complexeld with one or more tertiary phosphine ligands. The class of preferred complexes is therefore characterized by the presence within the complex of three molecules of carbon monoxide and one tertiary phosphine moiety for each atom of cobalt. As is discussed in greater detail hereinbelow, the tertiary phosphine complexing ligand portion of the catalyst complex comprises a mono- to di-phosphine wherein each phosphorus is completely substituted with organic substituents attached to the phosphorus by carbon-phosphorus bonds, and at least one substituent of each phosphorus is an aliphatic substituent.

In one modification of the process of the invention, the tertiary phosphine stabilizing ligand is a monodentate ligand, that is, the stabilizing ligand is a tertiary phosphine of a single phosphorus atom as the sole complexing site in the tertiary phosphine ligand. This class of tertiary phosphines, herein termed mono-phosphines, is generically classified as tertiary mono-phosphine of from 3 to 36 carbon atoms wherein at least one phosphorus substituent is aliphatic and each phosphorus substituent is a hydrocarbon substituent, i.e., contains only atoms of carbon and hydrogen, and is free from aliphatic unsaturation. A preferred class of tertiary monophosphines is represented by the formula

RRRP wherein R independently is monovalent hydrocarbon of up to 20 carbon atoms, preferably up to 12, and is free from aliphatic unsaturation, with the proviso that two R may together form a divalent hydrocarbon moiety of up to 12 carbon atoms. Of course, at least one phosphorus substituent is aliphatic as is previously stated. The group R, when monovalent, is therefore alkyl, cycloalkyl or aryl of up to 12 carbon atoms, preferably of up to 6 carbon atoms, and is illustrated by alkyl R groups such as methyl, ethyl, butyl, isobutyl, 2-ethylhexyl, octyl, benzyl, β-phenylethyl and dodecyl; by cycloalkyl R groups such as cyclopentyl, cyclohexyl, cyclooctyl, 2,3-diethylcyclopentyl, 4-butylcyclohexyl, 2,4,5-trimethylcyclohexyl and 3-butylcyclooctyl; and by aryl R groups such as phenyl, tolyl, xylyl, o-phenylphenyl, p-tert-butyl-phenyl, 2,4-diethylphenyl and m-cyclohexylphenyl.

The wholly aliphatic phosphines comprise a particularly suitable class of tertiary mono-phosphines, especially when each R is a straight chain primary alkyl group, e.g., tri-n-butylphosphine. An additonal class of particularly preferred tertiary mono-phosphines comprises the class wherein two R groups together form a divalent hydrocarbon moiety. Such cyclophosphines are illustrated by 1-ethylphospholidine, 1-phenylphospholidine, 1-phenylphosphorinane, 1-butylphosphorinane, 4,4-dimethyl-1-phenylphosphorinane, 1-phenylphosphepane, 1-ethylphosphepane, 3,6-dimethyl - 1 - phenylphosphepane, 9 - phenyl - 9 - phosphabicyclo(4.2.1)nonane, 9 - phenyl - 9 - phosphabicyclo(3.3.1)nonane and 9-butyl-9 - phosphabicyclo(4.2.1) nonane.

In the modification where the phosphine portion of the phosphine-modified cobalt carbonyl complex is monophosphine, the catalyst comprises two atoms of cobalt, six molecules of carbon monoxide and two molecules of tertiary mono-phosphine. Such materials are represented by the formula $(RRRP)_2Co_2(CO)_6$ wherein R has the previously stated sginificance and at least one substituent of each phosphorus is aliphatic.

In an alternate modification of the phosphine-modified cobalt complexes of the invention, the tertiary phosphine employed in a bidentate ligand, i.e., the phosphine ligand is a tertiary di-phosphine. Preferred tertiary di-phosphine ligands are represented by the formula

RRP—R'—PRR wherein R has the previously stated significance and at a divalent, saturated, hydrocarbon aliphatic moiety, preferably α,ω-alkylene of from 2 to 3 carbon atoms. Illustrative di-phosphines of this class include 1,2-bis(diphenylphosphino)ethane, 1,2-bis(dibutylphosphino)ethane, 1,3-bis(dimethylphosphino)propane, 1,2 - bis(dihexylphosphino)propane, 1,2-bis(ditolylphosphino)ethane, 1,3-bis(phenylpropylphosphino)propane, 1-(dibutylphosphino)-3-(diphenylphosphino)propane and 1-(dioctylphosphino)-2-(dibutylphosphino)-propane. In this modification of the cobalt complex of the invention wherein tertiary di-phosphine is employed, the catalyst is represented by the formula $(RRP-R'-PRR)Co_2(CO)_6$ wherein R and R' have the previously stated significance.

Generically, the phosphine-modified cobalt complexes are characterized as dicobalt hexacarbonyl complexes of additionally present tertiary mono- to di-phosphine ligand sufficient to provide one phosphorus complexing moiety for each atom of cobalt present within the complex molecule. These complexes are represented by the general formula

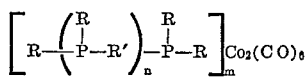

wherein R and R' have the previously stated significance with at least one substituent of each phosphorus being aliphatic, $n$ is a whole number from 0 to 1 inclusive and $m$ is a whole number from 1 to 2 inclusive selected so that the sum of $m$ and $n$, i.e., the term $(m+n)$, equals 2.

The optimum ratio of ethylene oxide to phosphine-modified cobalt carbonyl complex will in part depend upon the particular epoxide and cobalt complex employed. However, molar ratios of ethylene oxide to cobalt complex from about 2:1 to about 100:1 are generally satisfactory, with molar ratios of from about 4:1 to about 15:1 being preferred. In one modification, the phosphine-modified cobalt carbonyl complex is employed as a preformed material, being prepared as by reaction of a cobalt salt with carbon monoxide and hydrogen in the presence of the tertiary phosphine ligand, then isolated and subsequently utilized in the present process. In an alternate modification, the phosphine-modified cobalt complex is prepared in situ as by addition to the reaction mitxure of a cobalt salt or cobalt octacarbonyl together with the tertiary phosphine ligand whose introduction into the catalyst complex is desired. For example, introduction to the reaction medium of a mixture of dicobalt octacarbonyl and tributylphosphine serves to form a complex equivalent to bis(tributylphosphine)dicobalt hexacarbonyl.

In practice, it is on occasion desirable to employ the phosphine-modified cobalt complex in conjunction with a minor proportion of excess tertiary phosphine ligand which is the same as or is different from the phosphine ligand(s) of the cobalt complex. Although the role of the excess phosphine is not known with certainty, the presence thereof in the reaction system appears to promote or otherwise modify catalyst activity. Although excess phosphine is not required, when excess phosphine is utilized amounts up to about 0.2 mole per mole of cobalt complex are satisfactory.

The process of the invention is conducted in liquid phase solution in an inert solvent and solvents which are liquid at reaction temperature and pressure and which are inert with regard to the reactants and catalyst are suitably employed. Best results are obtained when the reaction solvent is a secondary or tertiary alcohol. Primary alcohols are not suitable because of the reactive character thereof, and for the same considerations it is preferred that the reaction solvent be substantially anhydrous. Preferred alcohol solvents are secondary or tertiary aliphatic hydrocarbon alcohols, i.e., secondary or tertiary alkanols, of up to 10 carbons as illustrated by isopropyl alcohol, tert-butyl alcohol, sec-butyl alcohol, tert-amyl alcohol, triethyl carbinol, cyclohexanol, 3-methylcyclopentanol, dibutyl carbinol and dimethyl hexyl carbinol. Particularly preferred are acyclic secondary or tertiary alkanols of up to 5 carbon atoms; tertiary butyl alcohol is especially useful.

The amount of solvent to be employed is not critical. Typical molar ratios of reaction solvent to ethylene oxide vary from about 5:1 to about 150:1.

The process of the invention comprises contacting the ethylene oxide and catalyst in liquid-phase solution with carbon monoxide and molecular hydrogen. The molar ratio of carbon monoxide to hydrogen most suitably employed is from about 4:1 to about 1:6, with best results being obtained when ratios of from about 1:1 to about 1:3 are utilized. No special precautions need to be taken with regard to the carbon monoxide and hydrogen and commercial grades of these reactants are satisfactory. The carbon monoxide and hydrogen are suitably employed as separate materials although it is frequently advantageous to employ commercial mixtures of these materials, e.g., synthesis gas.

The process is conducted, in one modification, by charging the ethylene oxide, catalyst and reaction solvent to an autoclave or similar pressure reactor and introducing the hydrogen and carbon monoxide while the reaction mixture is maintained at reaction temperature. Alternatively, the process is conducted in a continuous manner as by contacting the reactants and catalyst during passage through a reactor which is typically tubular in form. For best results the process is conducted under conditions of elevated temperature and pressure. Reaction temperatures from about 60° C. to about 250° C. are satisfactory with the temperature range from about 100° C. to about 200° C. being preferred. In one method of effecting reaction, the reactants and catalyst are initially contacted at a comparatively low reaction temperature, e.g., from about 100° C. to about 160° C., and the temperature is raised either gradually or in stages during the course of the reaction. It is also useful, however, to conduct the reaction at or about a constant reaction temperature. The reaction pressure is desirably in the range of from about 600 p.s.i. to about 10,000 p.s.i., preferably from about 1000 p.s.i. to about 3000 p.s.i. In one modification of the process, inert diluent is present, e.g., inert gaseous diluents such as argon, helium, methane, nitrogen and the like, in which case the reaction pressure is properly considered to be the sum of the partial pressures of the materials other than diluent. In the preferred modification of the process, however, the reaction is conducted in the substantial absence of added diluent.

The course of the reaction is easily followed as by observing the pressure decrease within the reactor or by periodic withdrawal and analysis of samples from the reaction system. At the conclusion of reaction, the product mixture is separated by conventional methods such as selective extraction, fractional distillation, decantation, selective crystallization and the like. The unreacted ethylene oxide as well as the catalyst and reaction solvent as suitably recycled for further reaction.

The process of the invention results in the formation of trimethylene glycol and β-hydroxypropionaldehyde. Frequently observed is the acetal of the glycol and the hydroxyaldehyde products. The products are useful as chemical intermediates, particularly in the formation of polyethers and polyesters, polyurethanes, polyoxyalkylene glycols and the like. The relative proportion of glycol in the product mixture is improved by catalytic hydrogenation of the product mixture or the hydroxyaldehyde component thereof, or alternatively the hydroxyaldehyde is useful as an intermediate in the formation of acetals, carboxylic acids, amines and the like.

To further illustrate the improved process of the invention, the following examples are provided. It should be understood that the details thereof are not to be regarded as limitations, as they may be varied as will be understood by one skilled in this art.

Example I

To a reactor were charged 3 g. of ethylene oxide, 35 ml. of tert-butyl alcohol and 5 g. of bis(tributylphosphine)dicobalt hexacarbonyl. The reactor was pressurized with a 2:1 molar mixture of hydrogen and carbon monoxide to 1200–1500 p.s.i.g. and maintained at a temperature of 100–187° C. At the end of reaction the product mixture was separated by extraction with water, the organic phase was washed with water and the combined extract and washings were analyzed to determine the yields of trimethylene glycol and the trimethylene glycol acetal of β-hydroxypropionaldehyde. The yield of trimethylene glycol was 42% based on the ethylene oxide charged and the yield of the acetal, on the same basis, was 1%.

Example II

To a reactor was charged 3 g. of ethylene oxide, 35 ml. of isopropyl alcohol and 5 g. of bis(tributylphosphine)-dicobalt hexacarbonyl. The reactor was pressurized with a 2:1 molar mixture of hydrogen and carbon monoxide to 1200-1500 p.s.i.g. and maintained at 100-185° C. At the end of reaction the product mixture was separated by extraction with water, the organic phase was washed with water and the combined extract and washings were analyzed by gas-liquid chromatography. The yield of trimethylene glycol based on ethylene oxide charged was 38% and the yield of the trimethylene glycol acetal of β-hydroxypropionaldehyde was 4% on the same basis.

Example III

Good yields of trimethylene glycol are also obtained when the procedure of Example I is repeated employing each of the following catalysts in place of the bis(tributylphosphine)dicobalt hexacarbonyl of that example.

(a) Bis(ethyldiphenylphosphino)dicobalt hexacarbonyl.
(b) [1,2-bis(diphenylphosphino)ethane]dicobalt hexacarbonyl.
(c) Dicobalt octacarbonyl plus 9-phenyl-9-phosphabicyclo(4.2.1)-nonane.

We claim as our invention:

1. The process of producing trimethylene glycol and β-hydroxypropionaldehyde by intimately contacting
   (a) ethylene oxide,
   (b) tertiary phosphine-modified cobalt carbonyl catalyst, said phosphine being hydrocarbon tertiary mono- to di-phosphine wherein at least one substituent of each phosphorus is aliphatic,
   (c) carbon monoxide, and
   (d) hydrogen, the molar ratio of carbon monoxide to hydrogen being from about 4:1 to about 1:6,
in liquid-phase solution in an inert reaction solvent, at a temperature of from about 60° C. to about 250° C. and a pressure of from about 600 p.s.i. to about 10,000 p.s.i.

2. The process of claim 1 wherein the tertiary phosphine-modified cobalt carbonyl catalyst is represented by the formula

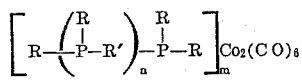

wherein R independently is hydrocarbon of up to 20 carbon atoms free from aliphatic unsaturation, R' is divalent saturated hydrocarbon aliphatic of from 2 to 3 carbon atoms, $n$ is a whole number from 0 to 1 inclusive, the sum of $m+n$ equals 2 and at least one substituent of each phosphorus is aliphatic, with the proviso that when $n$ is 0, two R together may form a divalent hydrocarbon moiety of up to 12 carbon atoms.

3. The process of claim 2 wherein the catalyst is represented by the formula

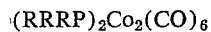

wherein R independently is hydrocarbon of up to 12 carbon atoms free from aliphatic unsaturation and at least one substituent of each phosphorus is aliphatic.

4. The process of claim 3 wherein the inert reaction solvent is a secondary alkanol or tertiary alkanol of up to 10 carbon atoms.

5. The process of claim 4 wherein the inert reaction solvent is tertiary butyl alcohol.

6. The process of claim 4 wherein the inert reaction solvent is isopropyl alcohol.

7. The process of claim 3 wherein R is alkyl.

8. The process of claim 3 wherein R is butyl.

9. The process of claim 2 wherein the tertiary phosphine-modified cobalt carbonyl catalyst is represented by the formula

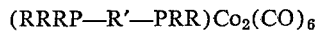

wherein R independently is hydrocarbon of up to 12 carbon atoms free from aliphatic unsaturation and R' is divalent saturated aliphatic hydrocarbon of from 2 to 3 carbon atoms.

10. The process of claim 9 wherein the inert reaction solvent is a secondary alkanol or tertiary alkanol of up to 10 carbon atoms.

References Cited
UNITED STATES PATENTS

| | | | |
|---|---|---|---|
| 3,102,899 | 9/1963 | Cannell | 260—439 |
| 3,054,813 | 9/1962 | Niederhauser | 260—602 X |

LEON ZITVER, Primary Examiner

R. H. LILES, Assistant Examiner

U.S. Cl. X.R.

260—615, 635